United States Patent
Morohashi et al.

(10) Patent No.: US 8,139,252 B2
(45) Date of Patent: Mar. 20, 2012

(54) IMAGE FORMING SYSTEM AND IMAGE FORMING METHOD

(75) Inventors: Takeo Morohashi, Yokohama (JP); Michio Osada, Fussa (JP); Masatsugu Kouguchi, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 740 days.

(21) Appl. No.: 12/105,080

(22) Filed: Apr. 17, 2008

(65) Prior Publication Data

US 2009/0046316 A1 Feb. 19, 2009

(30) Foreign Application Priority Data

Aug. 14, 2007 (JP) ................. 2007-211329

(51) Int. Cl.
*G06K 15/00* (2006.01)
*G03F 3/08* (2006.01)
*G06F 3/12* (2006.01)

(52) U.S. Cl. ........ 358/1.15; 358/2.1; 358/518; 358/1.13

(58) Field of Classification Search ................. 358/1.13, 358/1.14, 1.15, 1.16, 2.1, 518
See application file for complete search history.

(56) References Cited

U.S. PATENT DOCUMENTS

| | | | |
|---|---|---|---|
| 6,633,402 B1 * | 10/2003 | Shima et al. ................ | 358/1.15 |
| 2003/0098988 A1 * | 5/2003 | Kim et al. .................... | 358/1.13 |
| 2004/0042035 A1 | 3/2004 | Uejo | |
| 2004/0042037 A1 | 3/2004 | Uejo | |
| 2004/0042038 A1 | 3/2004 | Uejo | |
| 2004/0184107 A1 * | 9/2004 | Iino et al. ....................... | 358/2.1 |
| 2005/0280857 A1 * | 12/2005 | Sugiyama et al. ........... | 358/1.13 |

FOREIGN PATENT DOCUMENTS

| | | |
|---|---|---|
| JP | 10-166688 A | 6/1998 |
| JP | 2004-086809 | 3/2004 |
| JP | 2004-086810 | 3/2004 |
| JP | 2004-086811 | 3/2004 |
| JP | 2004-094440 | 3/2004 |
| JP | 2006-327016 A | 12/2006 |

OTHER PUBLICATIONS

Office Action issued on Jul. 1, 2009 in corresponding Japanese Patent Application No. 2007-211329, and English translation.
Chinese Official Action with English Translation translation, issued on Apr. 28, 2011 in corresponding Chinese Patent Application No. 200810145835.0.

* cited by examiner

*Primary Examiner* — Charlotte M Baker
*Assistant Examiner* — Justin Katzwhite
(74) *Attorney, Agent, or Firm* — Buchanan Ingersoll & Rooney PC

(57) ABSTRACT

There is described an image forming system, which makes it possible to speedily implement the reprinting operation, and to alleviate the burden of the printer controller. The system includes a printer controller to parse a print job described in a Page Description Language so as to generate image data; and an image forming apparatus, configured separately from the printer controller, to implement a printing operation based on the image data. The printer controller applies a first processing to the print job so as to generate multi-value image data and transmits the multi-value image data to the image forming apparatus. The image forming apparatus applies a second processing to the multi-value image data, received from the printer controller, so as to generate processed image data, serving as printable image data based on which a reproduced image can be directly printed, and implements the printing operation based on the processed image data.

12 Claims, 11 Drawing Sheets

FIG. 3

50: JOB LIST SCREEN

| COPY | SCAN | STORE | READOUT | JOB LIST | MACHINE STATUS |
|---|---|---|---|---|---|
| | | | | DOCUMENT COUNT 20 | STORAGE RESIDUAL CAPACITY 99.939% |
| | | | | NUMBER OF RESERVED JOBS 0 | HDD RESIDUAL CAPACITY 97.932% |

| PRINT JOB | OUTPUT CONFIRMATION | TRANSMISSION HISTORY | NON-OUTPUT HISTORY | DEVELOPING STATUS |
|---|---|---|---|---|

| MODE IN OPERATION | STATUS | NUMBER OF SHEETS | NUMBER OF COPIES | TIME FOR RESIDUAL NUMBER OF SHEETS (MINUTES) | USER'S NAME | FILE NAME |
|---|---|---|---|---|---|---|

△ ▽  DETAIL
PRIORITY OUTPUT
PRIORITY
SUSPEND

DELETE

| MODE IN SUSPENSION | STATUS | NUMBER OF SHEETS | NUMBER OF COPIES | TIME FOR RESIDUAL NUMBER OF SHEETS (MINUTES) | USER'S NAME | FILE NAME |
|---|---|---|---|---|---|---|
| 0006HDD READING OUT | OUTPUT SUSPENSION | 20 | 1 | 20 | 1 | |

STOP
TICKET EDITING
△ ▽ RELEASE SUSPENSION
RELEASE ALL

FIG. 4

51: JOB TICKET EDITING SCREEN

SETTING CONTENTS

FUNDAMENTAL SETTING

<NUMBER OF COPIES>  0001
<ONE SIDE / BOTH SIDES>   ONE SIDE→ONE SIDE
<MAGNIFICATION>       VERTICAL  /1.000
                      HORIZONTAL /1.000
<COLOR>        FULL COLOR
<TRAY NUMBER>      TRAY 1
<PAPER SHEET SIZE>     A4
<KIND OF PAPER SHEET>  NORMAL PAPER
                       64-74g/m²

DOCUMENT SETTING

<BOTH SIDE STAPLING DIRECTION> LEFT-RIGHT STAPLING
<DOCUMENT SETTING DIRECTION> UPPER DIRECTION
<DOCUMENT IMAGE QUALITY> CHARACTER/ PHOTOGRAPHY
<KIND OF DOCUMENT> PRINTING
<SPECIAL DOCUMENT> NORMAL DOCUMENT
<THICKNESS> NORMAL
<DOCUMENT SIZE> FIXED SIZE DOCUMENT

OUTPUT SETTING

FACE-UP FORWARD DIRECTION    LEFT-RIGHT STAPLING
NON SORTING
PAPER SHEET TRAY / SUB TRAY

ADJUSTMENT BETWEEN OBVERSE AND REVERSE SIDES

| FIXED SIZE DOCUMENT | PREVIOUS PAGE | SETTING CHANGE | SETTING RELEASE | CONFIRMATION COPY | CLOSE |
|---|---|---|---|---|---|

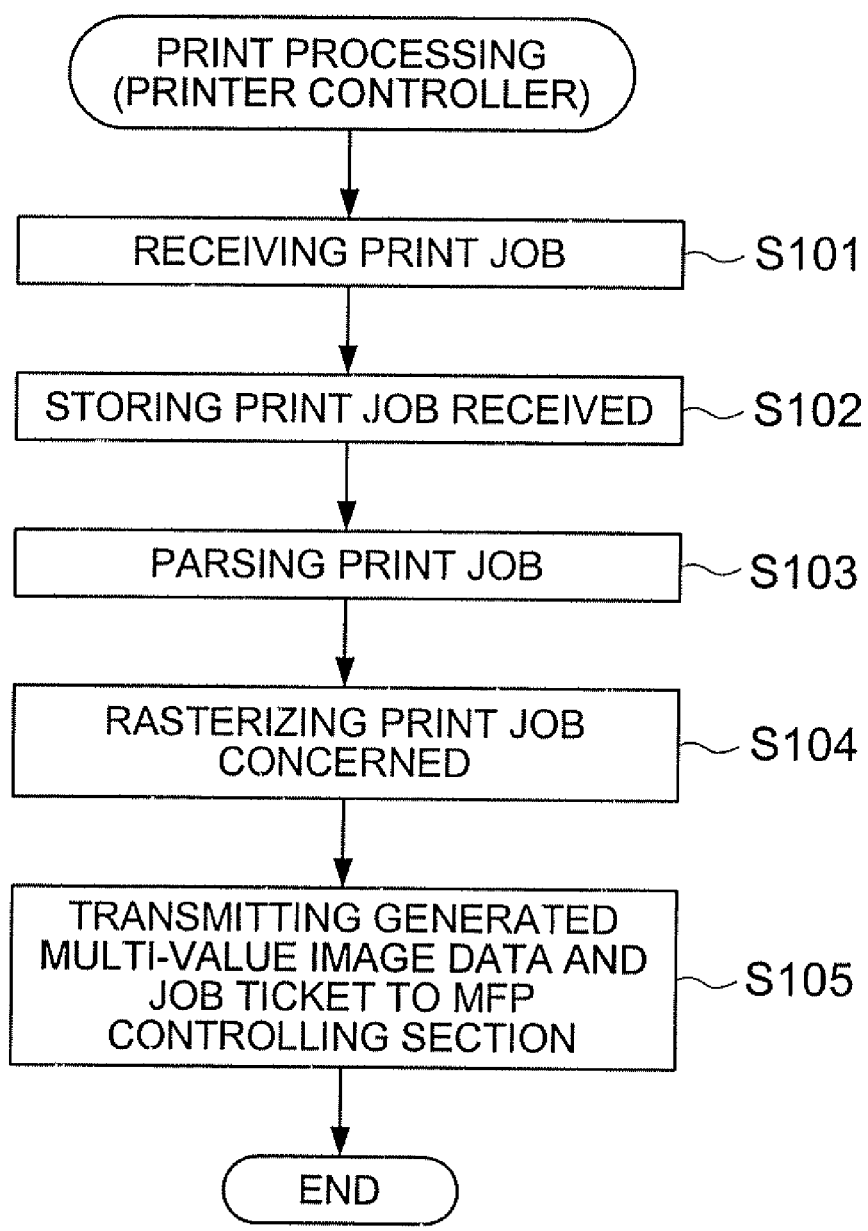

IMAGE FORMING SYSTEM AND IMAGE FORMING METHOD

This application is based on Japanese Patent Application NO. 2007-211329 filed on Aug. 14, 2007, with Japan Patent Office, the entire content of which is hereby incorporated by reference.

BACKGROUND OF THE INVENTION

The present invention relates to an image forming system and an image forming method, and specifically relates to an image forming system including a printer controller and an image forming apparatus, which are separately configured relative to each other, and an image forming method employing the abovementioned image forming system.

In recent years, there have been increasingly proliferated in the market various kinds of copiers or multi-functional apparatuses, each provided with a combination of plural functions, such as a copy function, a facsimile function, a printer function, a scanner function, etc., (hereinafter, referred to as an image forming apparatus as a general term for each of them). When the image forming apparatus is employed as the network printer to implement the printing operation, at first, the image forming apparatus receives a print job in the format of the Page Description Language (hereinafter, also referred to as the PDL, for simplicity), and rasterizes the print job (bitmap developing operation) so as to generate multi-value (for instance, 8-bit) image data, and successively, applies screening processing (binarization processing) to the multi-value image data so as to generate binary image data, and then, applies various kinds of image adjustment processing to the binary image data to output the reproduced image onto the paper sheet medium.

In this connection, in such a system that a plurality of image forming apparatuses are coupled to each other through a network, and each of the plurality of image forming apparatuses individually implements the processing for generating the multi-value image data from the print job (hereinafter, referred to as a RIP (Raster Image Processor) processing, for simplicity), the processing for screening the multi-value image data and the processing for applying the image adjustment processing (hereinafter, referred to as an image data processing), each of the plurality of image forming apparatuses should have the functions for implementing the various processing mentioned in the above, and accordingly, the configuration of each of them becomes complicated. To avoid such the complication, in the system as mentioned in the above, a printer controller that is provided with the abovementioned RIP processing function and the screening function is coupled to the network, so that the printer controller can be proxy for implementing the abovementioned processing.

Concretely speaking, as shown in FIG. 13, a conventional image forming system is provided with a printer controller 100 and an image forming apparatus 110, while the printer controller 100 is constituted by a network connecting port 101 to connect the printer controller 100 to the network, a PDL storage section 102 to store the print job in the format of the Page Description Language, received from the client terminal device, a RIP processing section 103 to rasterize the print job so as to generate the multi-value image data, a color conversion section 104 to conduct a color conversion processing at the time of the RIP processing, a compression/expansion processing section 105 to apply the screening processing to the multi-value image data so as to generate binary image data, an image-data and job-ticket storage section 106 to store the binary image data and the job ticket therein, a video interface section 107 to output video signals based on the binary image data, a display section 108, an operating section 109, etc.

On the other hand, the image forming apparatus 110 is constituted by a scanner inputting section 111 to input image data read from an original document by employing a scanner, a print data receiving section 112 to receive the binary image data sent from the printer controller 100, a facsimile data receiving section 113 to receive facsimile data, a MFP (Multi-Functional Peripheral) controlling section 114 to instruct processing of data inputted or received according to the setting items designated from an operating panel 117, an image processing section 115 to conduct the image adjusting operations, an image outputting section 116 to output a reproduced image based on the processed image data onto the paper sheet medium, the operating panel 117 to conduct various kinds of setting operations, etc.

In the abovementioned system configuration, the printer controller 100 receives the print job in the format of the Page Description Language, sent from a client terminal device, and transmits the binary image data and the job ticket, generated by applying the RIP processing and the screening operation to the received print job, to the image forming apparatus 110, so that the image forming apparatus 110 applies the image adjustment processing, etc., to the binary image data, so as to implement the printing operation.

However, according to the above system configuration in which the print job and the binary image data are stored in the printer controller 100, when the reprint of the print job concerned is instructed, the printer controller 100 should again transmit the same binary image data to the image forming apparatus 110. This not only impedes a speedy reprint of the print job concerned, but also causes such a problem that a data communication between the printer controller 100 and the image forming apparatus 110 becomes necessary.

To overcome such the deficiency, Tokkai 2004-86809, Tokkai 2004-86810, Tokkai 2004-86811 and Tokkai 2004-94440 (Japanese Non-Examined Patent Publications) set forth the configuration in which the binary image data are stored in the image forming apparatus side, so that, when the reprint of the print job concerned is instructed, the image forming apparatus can implement the reprint of the concerned print job by utilizing the binary image data stored in the image forming apparatus itself.

According to the configuration set forth by the above Patent Documents, when the reprint of the print job, to be implemented without conducting image data processing, is instructed, it becomes possible to implement the reprint by utilizing the binary image data stored in the image forming apparatus as it is. However, when the reprint of the print job, to be implemented associated with conducting various kinds of image data processing including a color balance adjustment, a sharpness adjustment, a brightness adjustment, a contrast adjustment, etc., is instructed, the implementation of such the image data processing should be requested to the printer controller. Then, according to the instruction, the printer controller should regenerate the binary image data by applying the RIP processing and the screening processing, so as to resend the regenerated binary image data to the image forming apparatus. Accordingly, not only the speedy reprinting operation cannot be implemented, but also the load of the printer controller increases, and the data communication between the printer controller and the image forming apparatus becomes necessary.

Further, although the image forming apparatus, having a printer function and/or a copy function, is originally provided with an image processing section to convert the scan data, acquired by scanning the original document, to the print data for print output use at the time of copying, this hardware resource is not used when the printing operation is implemented on the basis of the binary image data transmitted from the printer controller. This causes such a problem that the ability inherently provided in the image forming apparatus is not effectively utilized (or demonstrated).

SUMMARY OF THE INVENTION

To overcome the abovementioned drawbacks in conventional image forming systems and image forming methods, it is one of objects of the present invention to provide an image forming system and an image forming method, each of which makes it possible not only to speedily implement the reprinting operation, but also to alleviate the burden incurred to the printer controller, and further, each of which also makes it possible to reduce the amount of data communications to be conducted between the printer controller and the image forming apparatus.

Accordingly, at least one of the objects of the present invention can be attained by any one of the image forming systems described as follows.

(1) According to an image forming system reflecting an aspect of the present invention, the image forming system comprises: a printer controller to parse a print job described in a Page Description Language so as to generate image data; and an image forming apparatus, configured separately from the printer controller, to implement a printing operation based on the image data; wherein the printer controller is provided with: a first processing section to apply a first processing to the print job so as to generate multi-value image data; and a transmitting section to transmit the multi-value image data to the image forming apparatus; and wherein the image forming apparatus is provided with: a receiving section to receive the multi-value image data transmitted by the transmitting section; a second processing section to apply a second processing to the multi-value image data so as to generate processed image data, serving as printable image data based on which a reproduced image can be directly printed; and an image outputting section to implement the printing operation based on the processed image data.

(2) According to another aspect of the present invention, in the image forming system recited in item 1, the printer controller is further provided with: a first storage section to store the print job; while the image forming apparatus is further provided with: a second storage section to store the multi-value image data; and a control section to determine whether or not a reapplication of the first processing is necessary for a reprinting operation, based on a changed content of a job ticket correlated to the multi-value image data, when the reprinting operation is instructed; and wherein, when determining that the reapplication of the first processing is not necessary, the control section reads out the multi-value image data from the second storage section, to make the second processing section apply the second processing to the multi-value image data, and then, makes the image outputting section implement the printing operation based on the processed image data generated by the second processing section; and wherein, when determining that the reapplication of the first processing is necessary, the control section sends a request for retransmitting multi-value image data, regenerated corresponding to the changed content of the job ticket, to the printer controller.

(3) According to still another aspect of the present invention, in the image forming system recited in item 2, receiving the request for retransmitting the multi-value image data, the printer controller reads out the print job from the first storage section, to regenerate the multi-value image data corresponding to the changed content of the job ticket, and retransmits the multi-value image data regenerated to the image forming apparatus; and receiving the multi-value image data regenerated, the image forming apparatus makes the second processing section apply the second processing, corresponding to the changed content of the job ticket, to the multi-value image data received, and makes the image outputting section implement the printing operation based on the processed image data revised.

(4) According to still another aspect of the present invention, in the image forming system recited in item 2, when the changed content of the job ticket indicates necessity of a color conversion processing, the control section determines that the reapplication of the first processing is necessary.

(5) According to still another aspect of the present invention, in the image forming system recited in item 4, the changed content of the job ticket, indicating necessity of the color conversion processing, is any one of a kind change of paper sheet, a designation change of paper sheet feeding tray associated with the kind change of paper sheet, a designation change of screen, a designation change of profile and a designation change of rendering intent.

(6) According to still another aspect of the present invention, in the image forming system recited in item 2, the control section determines whether the multi-value image data is represented in a CMYK or a gray scale; and, when determining that the multi-value image data is represented in the gray scale, the control section suspends the operation for determining whether or not the reapplication of the first processing is necessary for the reprinting operation.

(7) According to yet another aspect of the present invention, in the image forming system recited in item 2, the image forming apparatus is further provided with a document reading section and/or a facsimile data receiving section, and the multi-value image data is stored in the second storage section in such a manner that a sender of the multi-value image data can be discriminated; and, when the reprinting operation is instructed, the control section discriminates the sender of the multi-value image data, so that the control section suspends the operation for determining whether or not the reapplication of the first processing is necessary for the reprinting operation when determining that the sender is either the document reading section or the facsimile data receiving section.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3 shows an exemplified screen configuration (a job list screen) to be displayed on a display section of an image forming apparatus;

FIG. 4 shows an exemplified screen configuration (a job ticket editing screen) to be displayed on a display section of an image forming apparatus;

FIG. 5 shows a flowchart indicating a procedure of a printing operation to be conducted in a printer controller embodied in the present invention as EMBODIMENT 1;

DETAILED DESCRIPTION OF THE PREFERRED EMBODIMENT

Figure 1:
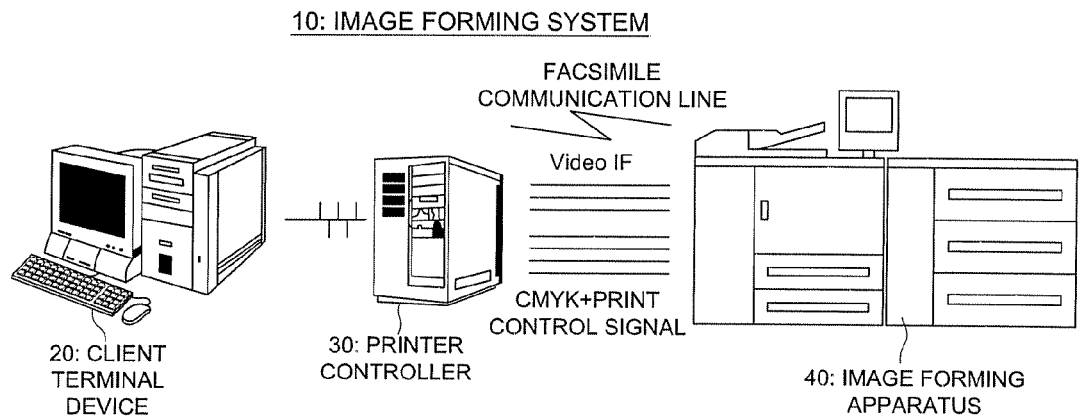
FIG. 1 shows a schematic diagram of an image forming system, embodied in the present invention as EMBODIMENT 1.

As described in the "BACKGROUND OF THE INVENTION", well-known is the system, which includes a printer controller and an image forming apparatus, each configured separately from each other, and the Patent documents have set forth the system configuration in which the printer controller conducts the RIP processing and the screening operation, and stores the print job and the binary image data therein. However, in such the conventional system configuration, when the reprinting operation of the print job, to be implemented associated with conducting various kinds of image data processing, is instructed, the printer controller should regenerate the binary image data by applying the RIP processing and the screening processing, so as to resend the regenerated binary image data to the image forming apparatus. Accordingly, there have been such problems that not only the reprinting operation requires much time, but also the load of the printer controller increases, and the data communication between the printer controller and the image forming apparatus becomes necessary. In addition, there has been another problem that, irrespective of the fact that the image forming apparatus is originally provided with the image processing section to process the scan data, this image processing section has not been effectively utilized.

In this connection, it could be considered that the RIP processing section and the image data processing section are configured by physically separating them from each other, in such a manner that the RIP processing section and the image data processing section are functionally independent from each other. In the abovementioned configuration, since the processing of the RIP processing section and that of the image data processing section can be separately conducted in an asynchronous fashion, each of them can concentrate on its own processing, and it would be possible to promote the high performance ability and the high functionality of the system.

However, since, in order to configure the RIP processing section and the image data processing section separately and independently from each other, the image data processing section should conduct even such the function that is inherently preferable to be conducted by the RIP processing section, it is not necessary possible to promote the high performance ability and the high functionality of the system. For instance, the color conversion processing is achieved normally in the RIP processing by conducting the mapping operation from the source color space to the destination color space in mid-process of conducting the depicting operation for every object. On the other hand, when the color conversion processing is conducted in the image data processing, both the information of the image data color space and the other information of the color space before image data conversion processing are necessary. Further, when the color space is different for every object, the information for identifying the object and the other information of the color space for every object are necessary, and accordingly, the processing becomes complicated. Still further, since the image data should be converted for every pixel, there arises a problem in regard to the performance aspect, and it would be necessary to employ expensive parts, such as an ASIC (Application Specific Integrated Circuit), etc. Therefore, by configuring a good combination of the RIP processing and the image data processing so as to effectively utilize the merits of each of them, it becomes possible to constitute a superior image forming system, which makes it possible to promote both the high performance ability and the high functionality of the system.

Accordingly, in the system configuration, embodied in the present invention, the printer controller is provided with the RIP processing section and the color conversion section, so that the printer controller rasterizes the print job in the format of the Page Description Language to generate the multi-value image data, and transmits the multi-value image data to the image forming apparatus, while the image forming apparatus is provided with the compression/expansion processing section, so that the image forming apparatus applies various kinds of image data processing, such as the screening operation, the image adjustment processing, etc., to the multi-value image data, and implements the printing operation based on the processed image data. Further, the printer controller stores the print job, to be rasterized for reprinting operation, therein, while the image forming apparatus stores the multi-value image data, just received from the printer controller before applying the image data processing, therein. Then, when the reprinting operation is instructed, the image forming apparatus applies the image data processing to the multi-value image data and implements the reprinting operation, according to the instructions inputted from the operating panel.

Further, since the instructions, inputted from the operating panel, sometimes, include such an instruction that cannot be handled by the image data processing, the image forming apparatus determines whether or not the reprinting operation instructed from the operating panel requires a RIP reprocessing (in other words, whether or not it requires the color conversion processing). When determining that the instructed reprinting operation requires the RIP reprocessing, the image forming apparatus requests the printer controller to conduct the RIP reprocessing. In response to the request, the printer controller regenerates the multi-value image data from the print job concerned and retransmits the regenerated multi-value image data to the image forming apparatus, so that the image forming apparatus applies the designated image data processing to the regenerated-and-retransmitted multi-value image data so as to implement the reprinting operation based on the reprocessed image data.

As described in the above, by storing the multi-value image data in the storage section of the image forming apparatus side so as to implement the image data processing in the image forming apparatus, and by cooperating with the printer controller so as to establish an appropriate Role allotment between them for effectively utilizing the merits of each of them, it becomes possible not only to improve the productivity of the reprinting operation, but also to effectively utilize the resources of the image forming apparatus, and to construct a flexible work flow corresponding to the functions and the features of the image forming apparatus concerned. Furthermore, since the printer controller can exclusively concentrate on the RIP processing, it also becomes possible to promote the improvement of the system productivity as a whole.

[Embodiment 1]

Figure 2:
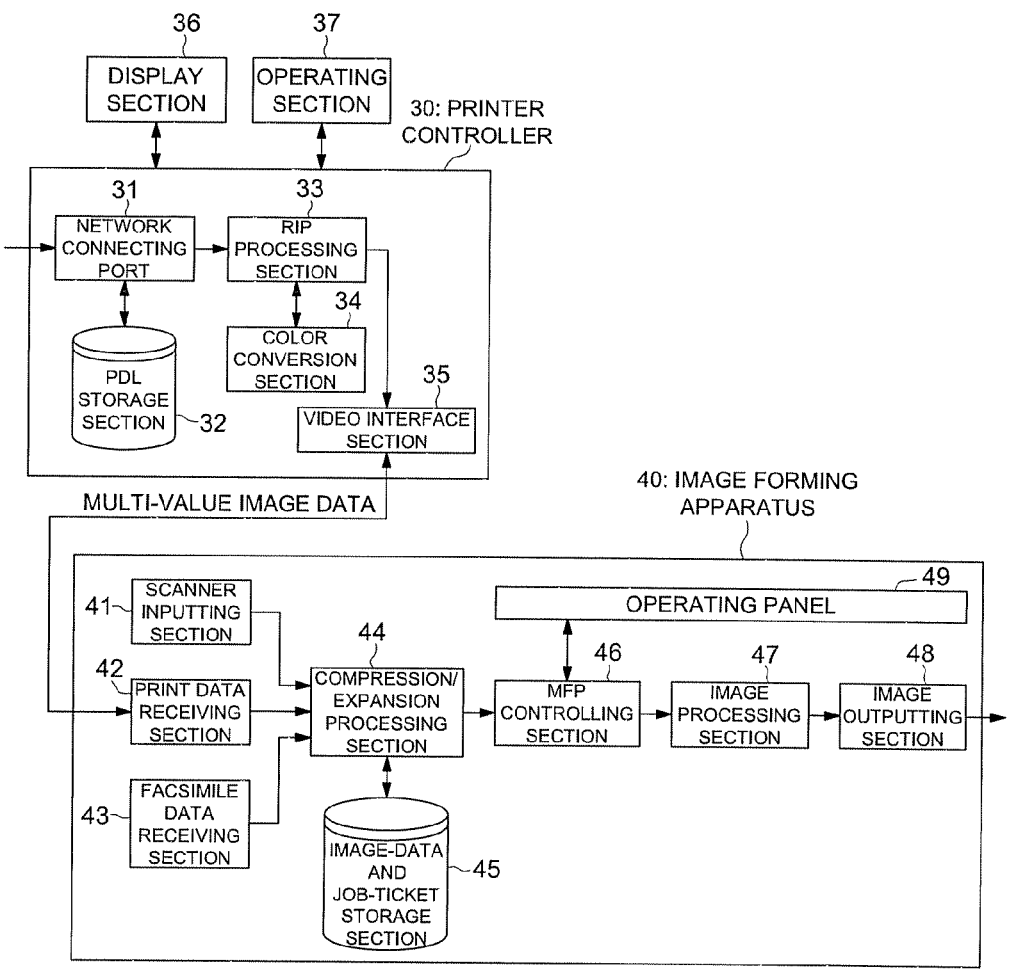
FIG. 2 shows a block diagram indicating configurations of a printer controller and an image forming apparatus and a processing flow of them, embodied in the present invention as EMBODIMENT 1.
Figure 6:
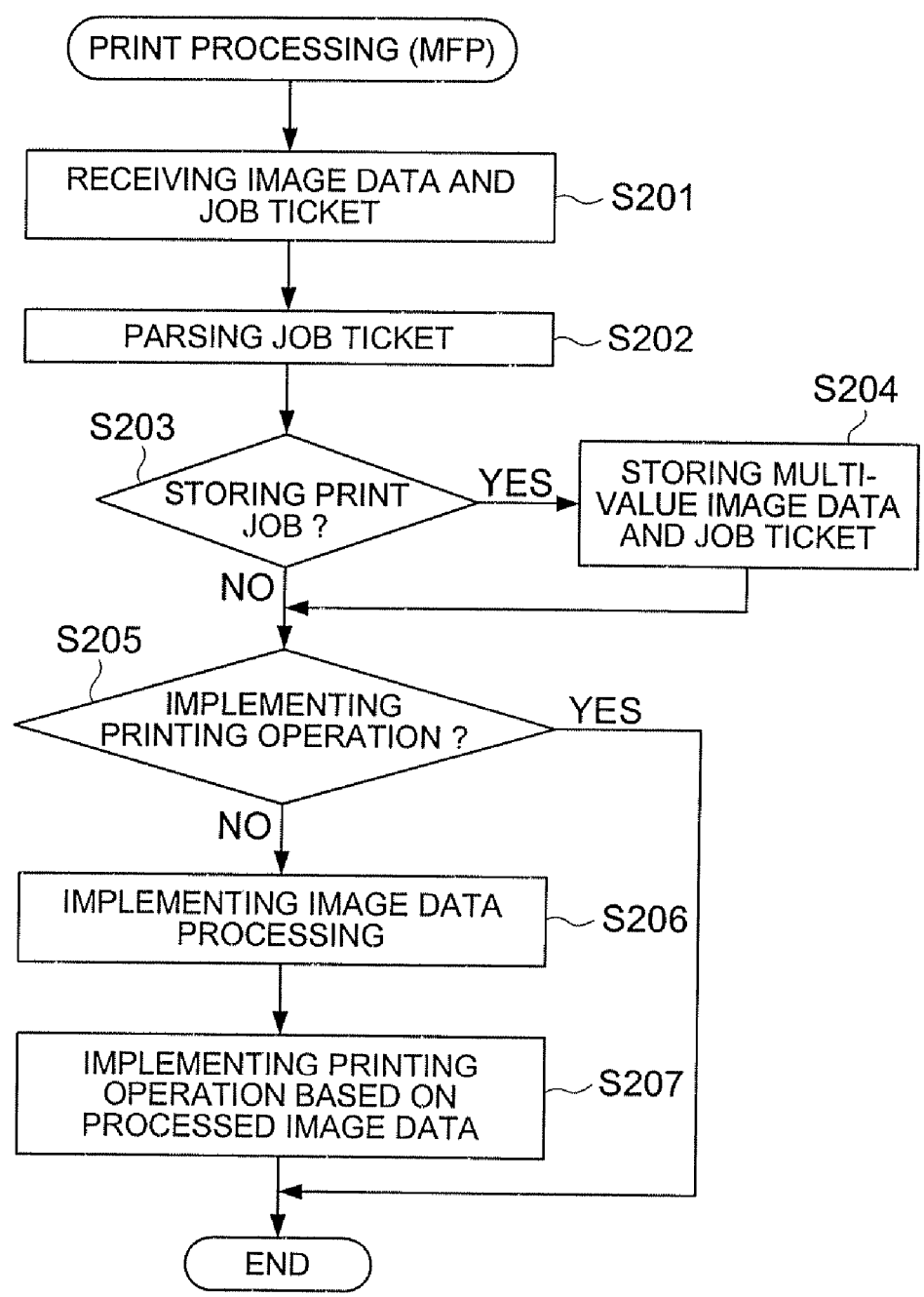
FIG. 6 shows a flowchart indicating a procedure of a printing operation to be conducted in an image forming apparatus embodied in the present invention as EMBODIMENT 1.
Figure 7:
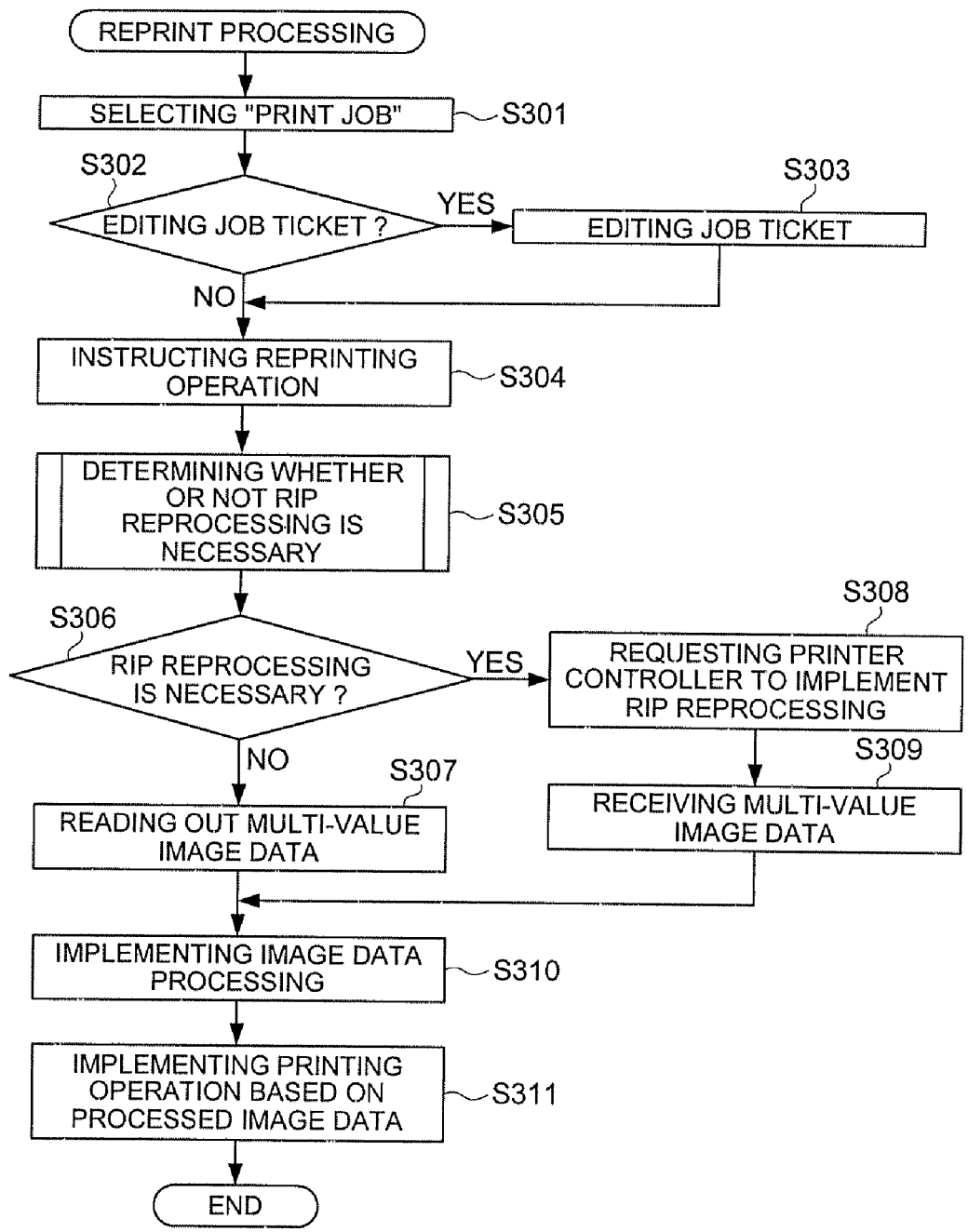
FIG. 7 shows a flowchart indicating a procedure of a reprinting operation to be conducted in an image forming apparatus embodied in the present invention as EMBODIMENT 1.
Figure 8:
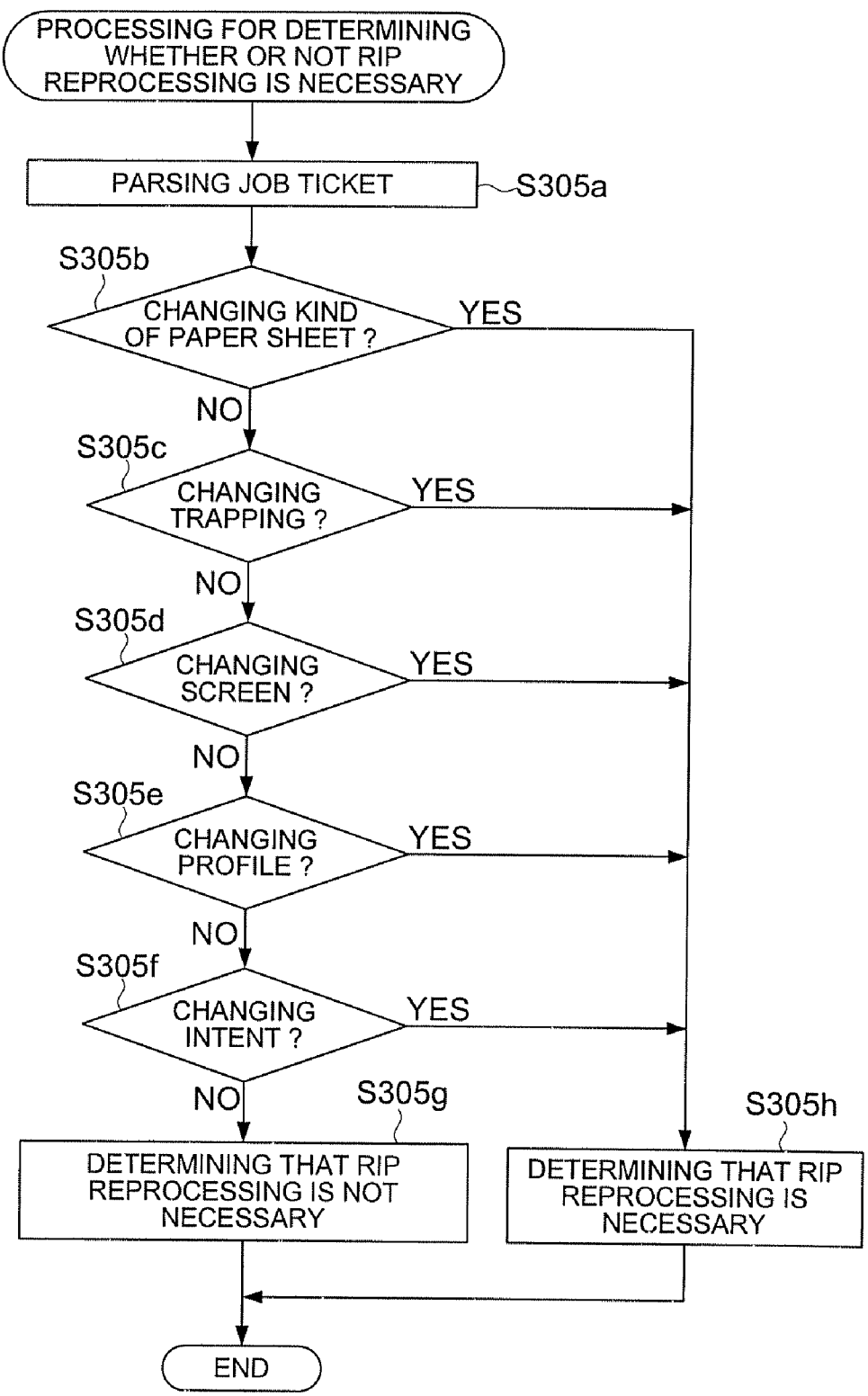
FIG. 8 shows a flowchart indicating a procedure of determining whether or not a RIP reprocessing is necessary for a reprinting operation, embodied in the present invention as EMBODIMENT 1.

In order to further detail the aforementioned embodiment of the present invention, referring to FIG. 1 through FIG. 8, an image forming system and an image forming method, embodied in the present invention as EMBODIMENT 1, will be detailed in the following. FIG. 1 shows a schematic diagram of the image forming system, embodied in the present invention; FIG. 2 shows a block diagram indicating configurations of a printer controller and an image forming apparatus and a processing flow of them; and FIG. 3 and FIG. 4 show screen configurations to be displayed on a display section of the image forming apparatus. Further, FIG. 5 and FIG. 6 show flowcharts indicating procedures of a printing operation to be conducted in the image forming system embodied in the present invention as EMBODIMENT 1, while FIG. 7 and FIG. 8 show flowcharts indicating procedures of a reprinting operation.

As shown in FIG. 1, an image forming system 10 of EMBODIMENT 1 is constituted by a client terminal device 20, a printer controller 30 and an image forming apparatus 40.

Concretely speaking with respect to the printer controller 30 and the image forming apparatus 40, as shown in FIG. 2, the printer controller 30 is constituted by a network connecting port 31, such as a NIC (Network Interface Card), etc., to receive a print job in the format of the Page Description Language from the client terminal device 20 through a communication network; a PDL storage section 32 to store the print job; a RIP processing section 33 to parse the print job so as to generate multi-value image data, such as 8-bit image data, etc.; a color conversion section 34, such as a CMM (Color Management Module), etc., to conduct a color conversion processing; a video interface section 35 to conduct a transferring operation of the multi-value image data and a transacting operation of a job ticket; a display section 36, such as a LCD (Liquid Crystal Display), etc.; an operating section 37, such as a mouse, a keyboard, etc.; etc.

Further, the image forming apparatus 40 is constituted by a scanner inputting section 41 to input image data read from an original document by employing a scanner; a print data receiving section 42 to receive the multi-value image data sent from the printer controller 30; a facsimile data receiving section 43 to receive facsimile data; a compression/expansion processing section 44 to conduct a low resolution processing, a screening processing, etc., by compressing and expanding the multi-value image data, so as to generate binary image data or quasi-gradation image data (hereinafter in this embodiment, the binary image data is employed); an image-data and job-ticket storage section 45 to store the multi-value image data and the job ticket therein; a MFP (Multi-Functional Peripheral) controlling section 46 to instruct processing of data inputted or received according to the setting items designated from an operating panel 49; an image processing section 47 to apply the image adjustment processing, etc., to the binary image data so as to generate printable image data (hereinafter, the combination of the processing to be conducted by the compression/expansion processing section 44 and that to be conducted by the image processing section 47 is referred to as an image data processing); an image outputting section 48 to output a reproduced image based on the processed image data onto the paper sheet medium; the operating panel 49 that is provided with a touch sensor formed on a LCD; etc.

In this connection, although the image data and the job ticket are stored in the image-data and job-ticket storage section 45 in the configuration shown in FIG. 2, it is applicable that the system is so constituted that the image data and the job ticket are stored in separate storage sections. Further, although the compression/expansion processing section and the image-data and job-ticket storage section are excluded from the printer controller 30 in the configuration shown in FIG. 2, it is applicable that the system is so constituted that the printer controller 30 is also provided with them. Still further, although the image forming apparatus 40 is provided with the scanner inputting section 41, the print data receiving section 42 and the facsimile data receiving section 43 as the data inputting section in the configuration shown in FIG. 2, it is applicable that the image forming apparatus 40 is provided with at least the print data receiving section 42 as the data inputting section.

Next, referring to the flowcharts shown in FIG. 5 and FIG. 6, the procedure for implementing the printing operation by employing the image forming system 10 will be detailed in the following.

Initially, document data is created by employing an application program in the client terminal device 20, and then, a print job, in which the document data is converted to the image data described in the format of the Page Description Language, represented by the PS (Post Script) or the PCL (Printer Control Language), is created by using the function of the printer driver or the application program, so as to transmit the print job to the printer controller 30. In this connection, when the document data is such data that is described in a certain file format conformity with the direct printing, such as the XPS (XML Paper Specification), the PDF (Portable Document Format), etc., it is applicable that the document data is directly transmitted to the printer controller 30 without converting it to the data described in the Page Description Language.

Successively, the printer controller 30 employs the network connecting port 31 to receive the print job concerned (Step S101), and stores the received print job into the PDL storage section 32 (Step S102).

Still successively, the RIP processing section 33 parses the print job (Step S103), and rasterizes the print job concerned (Step S104). Then, the color conversion section 34 conducts the color conversion processing so as to generate multi-value image data.

Still successively, the printer controller 30 employs the video interface section 35 to transmit the generated multi-value image data and the job ticket, in which job attribute information and print setting information are described, to the image forming apparatus 40 (Step S105).

Still successively, the print data receiving section 42 of the image forming apparatus 40 receives the image data and the job ticket sent from the printer controller 30 (Step S201), and the MFP controlling section 46 parses the job ticket (Step S202) so as to determine whether or not the print job concerned should be stored, on the basis of the information indicated in the job ticket (Step S203). When determining that the print job concerned should be stored, the MFP controlling section 46 stores the multi-value image data and the job ticket into the image-data and job-ticket storage section 45 (Step S204).

Yet successively, the MFP controlling section 46 determines whether or not the printing operation should be implemented, on the basis of settings of the printer driver and the application program concerned, setting items of the image forming apparatus 40, etc. (Step S205). When determining that the printing operation should be implemented, the compression/expansion processing section 44 applies the screening processing to the multi-value image data so as to generate the binary image data (Step S206), and then, the image processing section 47 applies the image adjustment processing to the generated binary image data, so that the image outputting section 48 implements the printing operation based on the processed image data (Step S207).

In this connection, although the format and configuration of the job ticket are not limited to specific ones, for instance, the job ticket could be configured as shown in Table 1.

TABLE 1

| CATEGORY | ITEMS | COMMENTS | BF. RIP | AF. RIP |
|---|---|---|---|---|
| Job Attribute | Job ID | Job control number | | |
| | Color mode | CMYK/Gray scale | | |
| | Resolution | Degree of Resolution | | |
| | Gradation | Degree of Gradation | | |
| Fundamental Setting | Number of copies | Desig. of Number of copies | A | A |
| | One side/ both side print | Select One side or Duplex print | A | A |
| | Paper feeding tray | Select Paper feeding tray | A | B |
| | Paper size | Designation of Paper size | A | A |
| | Kind of paper | Select Kind of paper | A | C |
| Applied Setting | Inter sheet | Desig. of Insertion page, Tray | A | A |
| | Chapter division | Desig. of page for Chapter division | A | A |
| | One page integration | Select 2in1/2in1 repeat/4in1, etc. | A | A |
| | booklet | Desig. of booklet | A | A |
| | Insertion page | Desig. of Insertion page position | A | A |
| | Stapling margin | Desig. of Image shift amount | A | A |
| | Stamp | Designation of stamp | A | A |
| Color Setting | Color balance | Density adjustment for each of CMYK | A | A |
| | Sharpness | Designation of Contour stress | A | A |
| | Brightness | Brightness adjustment | A | A |
| | Contrast | Contrast adjustment | A | A |
| | Trapping | Designation of trapping method | A | C |
| | Screen | Setting of screen | A | C |
| | Profile | Selection of Source or Destination profile | A | C |
| | Rendering intent | Selection of Color space mapping method | A | C |
| Finish Setting | Ejected paper face | Selection of Face up or Face down | A | A |
| | Ejected paper order | Selection of Normal order or Reverse order | A | A |
| | Ejection tray | Selection of Ejection tray | A | A |
| | Sort/Group | Selection of Sort of Group | A | A |
| | Stapling | Designation of Stapling | A | A |
| | Punching | Designation of Punching | A | A |
| | Front/ Back paper | Designation of Front paper or Back paper | A | A |
| | Saddle stitch binding | Establishment of Saddle stitch binding | A | A |
| | Case binding | Designation of Case binding | A | A |
| | Job storing | Designation of Job storing | A | A |

Desig.: Designation,
AF. RIP: After RIP,
BF. RIP: Before RIP

The above-exemplified job ticket is editable from the operating panel 49 or the utility function of the image forming apparatus 40. For instance, when editing the job ticket from the operating panel 49 of the image forming apparatus 40, by selecting a "JOB LIST" and depressing a "TICKET EDITING BUTTON" in a job list screen 50 shown in FIG. 3, a job ticket editing screen 51 shown in FIG. 4 is displayed. Then, the job ticket can be edited by using the job ticket editing screen 51.

Next, referring to the flowcharts shown in FIG. 7 and FIG. 8, the procedure for implementing the reprinting operation to be conducted when the reprint is instructed will be detailed in the following.

Initially, the job list screen 50 shown in FIG. 3 is displayed on the operating panel 49 of the image forming apparatus 40, to select the "PRINT JOB" (Step S301).

Successively, the operator determines whether or not the job ticket should be edited (Step S302). When determining that the job ticket should be edited, the operator makes the operating panel 49 display the job ticket editing screen 51 as shown in FIG. 4, and edits the desired information (Step S303).

Still successively, returning to the job list screen 50, when the operator instructs the reprinting operation from the screen (or from the utility on the client terminal device 20 through the communication network and the printer controller 30) (Step S304), the image forming apparatus 40 implements the reprinting operation. However, since the instructed reprinting operation is processable within the image forming apparatus 40 itself, or also requires some processing to be conducted by the printer controller 30, in the present embodiment, the MFP controlling section 46 determines whether or not the RIP reprocessing is necessary, corresponding to the job ticket contents changed by the job ticket editing operation (Step S305).

Concretely speaking with reference to the job ticket indicated as Table 1, the items are categorized into five groups including the "JOB ATTRIBUTE", the "FUNDAMENTAL SETTING", the "APPLIED SETTING", the "COLOR SETTING" and the "FINISH SETTING". Since the items, marked with Symbol "A" in the column of the "AFTER RIP", relate to the functions of the image forming apparatus 40 side, the RIP reprocessing is not necessary for them. On the other hand, since the other items, marked with Symbol "B" or "C" in the column of the "AFTER RIP", require the color conversion to be achieved within the RIP processing section 33 or by communicating with the color conversion section 34, the RIP reprocessing becomes necessary.

For instance, since each of functions of the "NUMBER OF COPIES", the "ONE-SIDE/BOTH-SIDE", the "PAPER SHEET SIZE", which are categorized in the "FUNDAMENTAL SETTING" group, and items categorized in the "APPLIED SETTING" group, is equivalent to the copy function, each of them can be achieved by conducting a page order rearranging operation, a positioning operation, a rotating operation, etc. in the image processing section 47. Further, since the functional items, categorized in the "FINISH SETTING" group, relate to those to be conducted by the post processing apparatus of the image forming apparatus 40, such the items can be achieved by the image outputting section 48.

Further, since the image forming apparatus 40, embodied in the present invention, stores the multi-value image data therein, the adjustment items, such as the "COLOR BALANCE", the "SHARPNESS", the "BRIGHTNESS", the "CONTRAST", etc., categorized in the "COLOR SETTING" group, become processable for the image processing section 47 provided in the image forming apparatus 40. Since the abovementioned processing depend on the image forming apparatus 40, and are frequently utilized at the time of outputting operations of copies, facsimile, etc., it is desirable that those processing items are implemented in the image forming apparatus 40 side without conducting the RIP reprocessing operation. By implementing those processing items in the image forming apparatus 40 side, it becomes possible not only to speedily implement the reprinting operation, but also to reduce the load incurred to the printer controller 30, and further, it also becomes possible to reduce the amount of data communications between the printer controller 30 and the image forming apparatus 40.

On the other hand, since each of the items of the "KIND OF PAPER SHEET" categorized in the "FUNDAMENTAL SETTING" group, and the "TRAPPING", the "SCREEN", the "PROFILE", the "RENDERING INTENT", which are categorized in the "COLOR SETTING" group, requires the RIP reprocessing, the CMM conducts the color conversion processing based on the profiles of the source and the destination in the color management according to the ICC (International Color Consortium) profile. The color conversion should be conducted again not only for such the case that the profile is apparently changed, but also such the case that the kind of paper sheet and/or the screen is changed, since the destination profile is defined for every kind of paper sheet and every screen, and accordingly, the profile is also changed in conjunction with the change of the kind of paper sheet or the screen. Further, the case that the kind of paper sheet is changed due to the change of the paper sheet feeding tray is also regarded as the above case. Still further, the case that the rendering indent, serving as a mapping rule at the time of the color conversion processing, is changed is also regarded as the above case. Although the trapping is nothing to do with the color conversion processing, the RIP reprocessing is necessary when the processing is conducted in the RIP processing section 33.

Accordingly, as indicated in the flowchart shown in FIG. 8, abovementioned Step S305 further includes the steps of: parsing the job ticket (Step S305*a*); determining whether or not the changed content of the job ticket is any one of a change of the kind of the paper sheet (Step S305*b*), a change of the trapping (Step S305*c*), a change of the screen (Step S305*d*), a change of the profile (Step S305*e*), and a change of the intent (Step S305*f*); determining that the RIP reprocessing is necessary (Step S305*h*), when determining that the changed content of the job ticket is any one of them; and determining that the RIP reprocessing is not necessary (Step S305*g*), when determining that the changed content of the job ticket is not any one of them.

Still successively, returning to the flowchart shown in FIG. 7, when determining that the RIP reprocessing is not necessary (Step S306; No), the multi-value image data, stored in the image-data and job-ticket storage section 45, is read out (Step S307), so that the compression/expansion processing section 44 and the image processing section 47 applies various kinds of image data processing to the multi-value image data so as to generate the processed image data (Step S310). After that, the image outputting section 48 implements the printing operation based on the processed image data (Step S311).

On the other hand, when determining that the RIP reprocessing is necessary (Step S306; Yes), the MFP controlling section 46 request the printer controller 30 to implement the RIP reprocessing (Step S308). In response to the above request, the printer controller 30 reads out the concerned print job from the PDL storage section 32 to implement the RIP reprocessing according to the job ticket so as to generate the multi-value image data, and then, transmits the generated multi-value image data to the image forming apparatus 40. Receiving the multi-value image data sent from the printer controller 30 (Step S309), the image forming apparatus 40 employs the compression/expansion processing section 44 and the image processing section 47 to apply the image data processing, according to the job ticket, to the multi-value image data (Step S310). Then the image outputting section 48 implements the printing operation based on the processed image data (Step S311).

As described in the foregoing, the printer controller 30 not only store the print job in the format of the Page Description Language therein, but also generates the multi-value image data from the print job so as to transmit the generated multi-value image data to the image forming apparatus 40. On the other hand, receiving the multi-value image data, the image forming apparatus 40 not only stores the multi-value image data therein, but also applies the image data processing to the multi-value image data so as to implement the printing operation based on the processed image data. According to the above, even if the reprinting operation, which requires such the print data processing that cannot be coped with by the binary image data, is instructed, it is possible for the image forming apparatus 40 to implement the instructed reprinting operation by itself. Therefore, it becomes possible not only to speedily implement the reprinting operation, but also to alleviate the burden incurred onto the printer controller 30 and to reduce the communication amount between the printer controller 30 and the image forming apparatus 40. Further, when the reprinting operation that requires the RIP reprocessing is instructed, since the printer controller 30 generates the multi-value image data corresponding to the job ticket and resends the generated multi-value image data to the image forming apparatus 40, it becomes possible to securely implement the reprinting operation concerned.

[Embodiment 2]

Figure 9:
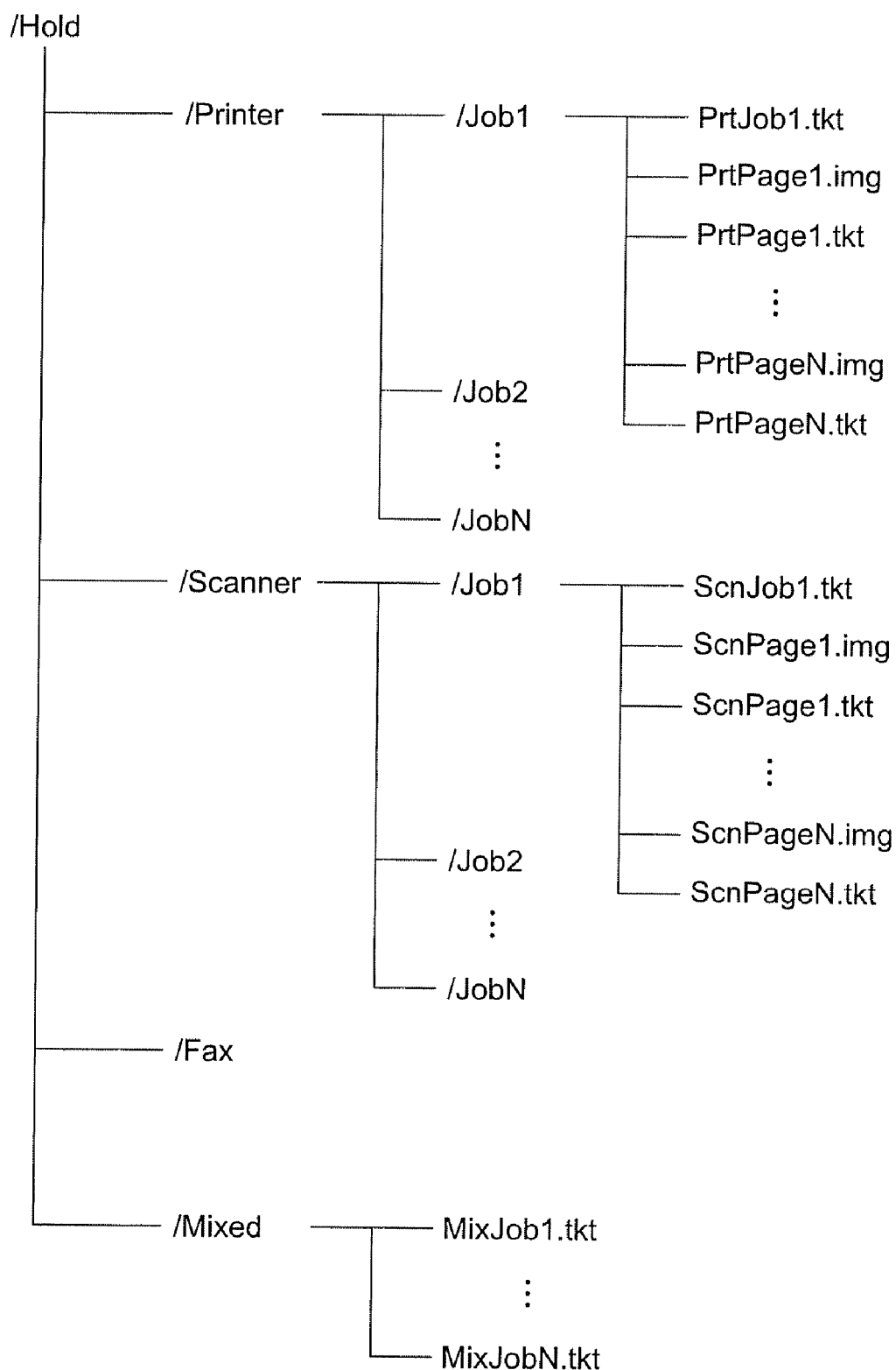
FIG. 9 shows a data structure of data to be stored in an image-data and job-ticket storage section of an image forming apparatus embodied in the present invention as EMBODIMENT 2.
Figure 10:
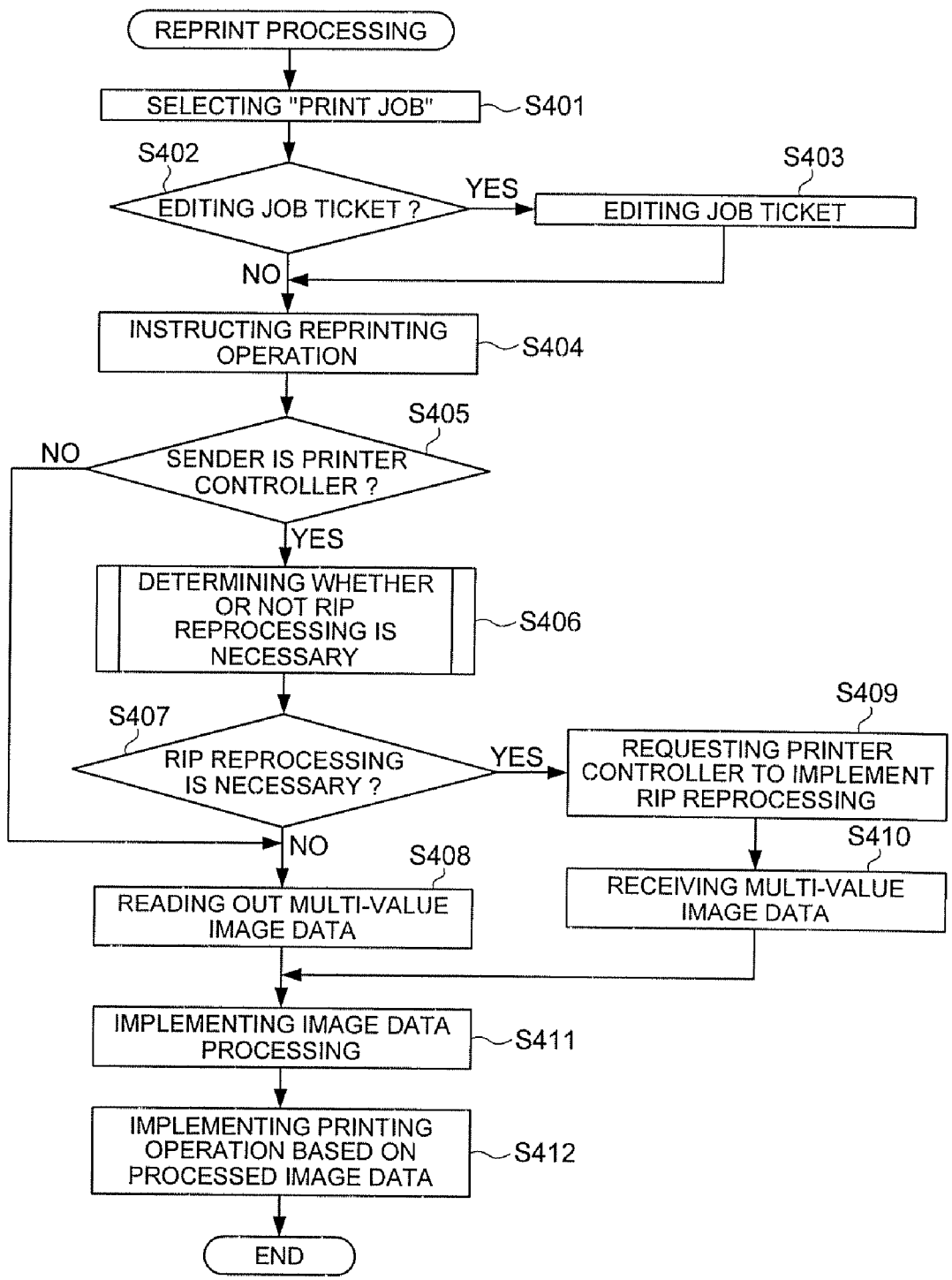
FIG. 10 shows a flowchart indicating a procedure of a reprinting operation to be conducted in an image forming apparatus embodied in the present invention as EMBODIMENT 2.

Referring to FIG. 9 and FIG. 10, an image forming system and an image forming method, embodied in the present invention as EMBODIMENT 2, will be detailed in the following. FIG. 9 shows a data structure of data to be stored in the image forming apparatus embodied in the present invention, and FIG. 10 shows a flowchart indicating a reprinting procedure.

In EMBODIMENT 2, the case that image data inputted from a scanner or a facsimile device, serving as an inputting device that is employed by the image forming apparatus 40 other than the printer controller 30, will be detailed in the following.

Even in EMBODIMENT 2, the system is so constituted that the image forming apparatus 40 is provided with the print data receiving section 42 and the facsimile data receiving section 43, so as to store the image data inputted from the printer controller 30, the scanner and the facsimile device, associated with the job ticket also inputted form each of them. For this purpose, in order to make it possible to discriminate the sender of the image data concerned, for instance, an HDD (Hard Disc Drive) is employed as the image-data and job-ticket storage section 45, so as to control them on the file system.

FIG. 9 shows a file controlling structure to be employed in the abovementioned case. As shown in FIG. 9, the extension <.tkt> represents the job ticket and the extension <.img> represents the file of the image data, so that the folder is created corresponding to the sender, to store the image data and the job ticket into the created folder as the file. In this example, folders are created for every print job under the specific sender's folder, so as to store the job ticket, the image data for every page and the page ticket as a file. In this connection, the contents of the job ticket would be such as, for instance, Table 1 aforementioned, while the contents of the page ticket should include information representing the page attributes, such as a line length, a number of lines, an orientation of the image, a resolution, a gradation, etc., and job ticket information being settable for ever page, for instance, as shown in Table 2. This page attributes are included in the print controlling information that is communicated at the time when the printer controller 30 transfers the image data to the image forming apparatus 40 through the video interface section 35.

TABLE 2

| CATEGORY | ITEMS | COMMENTS | BF. RIP | AF. RIP |
|---|---|---|---|---|
| Page Attribute | Line length | Width of Main scanning of Image data | — | — |
| | Number of Lines | Width of Sub scanning of Image data | — | — |
| | Direction of Image | Portrait/Landscape | — | — |
| | Resolution | Resolution degree of Image data | — | — |
| | Gradation | Gradation number of Image data | — | — |
| | Color | CMYK/Grayscale | — | — |
| Fundamental Setting | Number of copies | Desig. of Number of copies | A | A |
| | One side/ Both side | Select One side or Duplex print | A | A |
| | Paper feeding tray | Select Paper feeding tray | A | B |
| | Paper size | Designation of Paper size | A | A |
| | Kind of paper | Select Kind of paper | A | C |

AF. RIP: After RIP,
BF. RIP: Before RIP

In case that the files are controlled in the file controlling structure mentioned in the above, the procedure to be conducted at the time when the reprinting operation is instructed will be detailed in the following, referring to the flowchart shown in FIG. 10.

Initially, as well as conducted in EMBODIMENT 1 aforementioned, the operator selects the desired print job (Step S401), and determines whether or not the job ticket should be edited (Step S402). When determining that the job ticket should be edited (Step S402; Yes), the operator edits the desired information by using the job ticket editing screen 51 (Step S403), and, returning to the job list screen 50, the operator instructs the reprinting operation (Step S404).

Successively in EMBODIMENT 2, the MFP controlling section 46 discriminates the sender of the image data while referring to the file controlling structure (Step S405). When determining that the sender of the image data is not the printer controller 30 (Step S405; No), the procedure jumps to Step S408. When determining that the sender of the image data is the printer controller 30 (Step S405; Yes), the MFP controlling section 46 parses the changed contents made in the job ticket editing operation (Step S406) to determine whether or not the RIP reprocessing is necessary (Step S407).

Still successively, as well as EMBODIMENT 1 aforementioned, when determining that the RIP reprocessing is not necessary (Step S407; No), the MFP controlling section 46 reads out the image data stored in the image-data and job-ticket storage section 45 (Step S408). Then, the compression/expansion processing section 44 and/or the image processing section 47 applies image data processing to the image data to generate the processed image data (Step S411), so that the image outputting section 48 implements the printing operation based on the processed image data (Step S412).

On the other hand, when determining that the RIP reprocessing is necessary (Step S407; Yes), the MFP controlling section 46 requests the printer controller 30 to implement the RIP reprocessing (Step S409). In response to the above request, the printer controller 30 reads out the concerned print job from the PDL storage section 32, and makes the RIP processing section 33 implement the RIP reprocessing according to the job ticket, so as to generate the multi-value image data, and then, transmits the generated multi-value image data to the image forming apparatus 40. Receiving the multi-value image data sent from the printer controller 30 (Step S410), the image forming apparatus 40 employs the compression/expansion processing section 44 and the image processing section 47 to apply the image data processing, according to the job ticket, to the multi-value image data (Step S411). Then the image outputting section 48 implements the printing operation based on the processed image data (Step S412).

As mentioned in the above, according to EMBODIMENT 2, since each of the folders is created corresponding to each of the various senders, so as to control the image data and the job tickets by storing them as files, and, only for the image data inputted from the printer controller 30, it is determined whether or not the RIP reprocessing is necessary, it becomes possible to speedily implements the reprinting operation.

[Embodiment 3]

Figure 11:
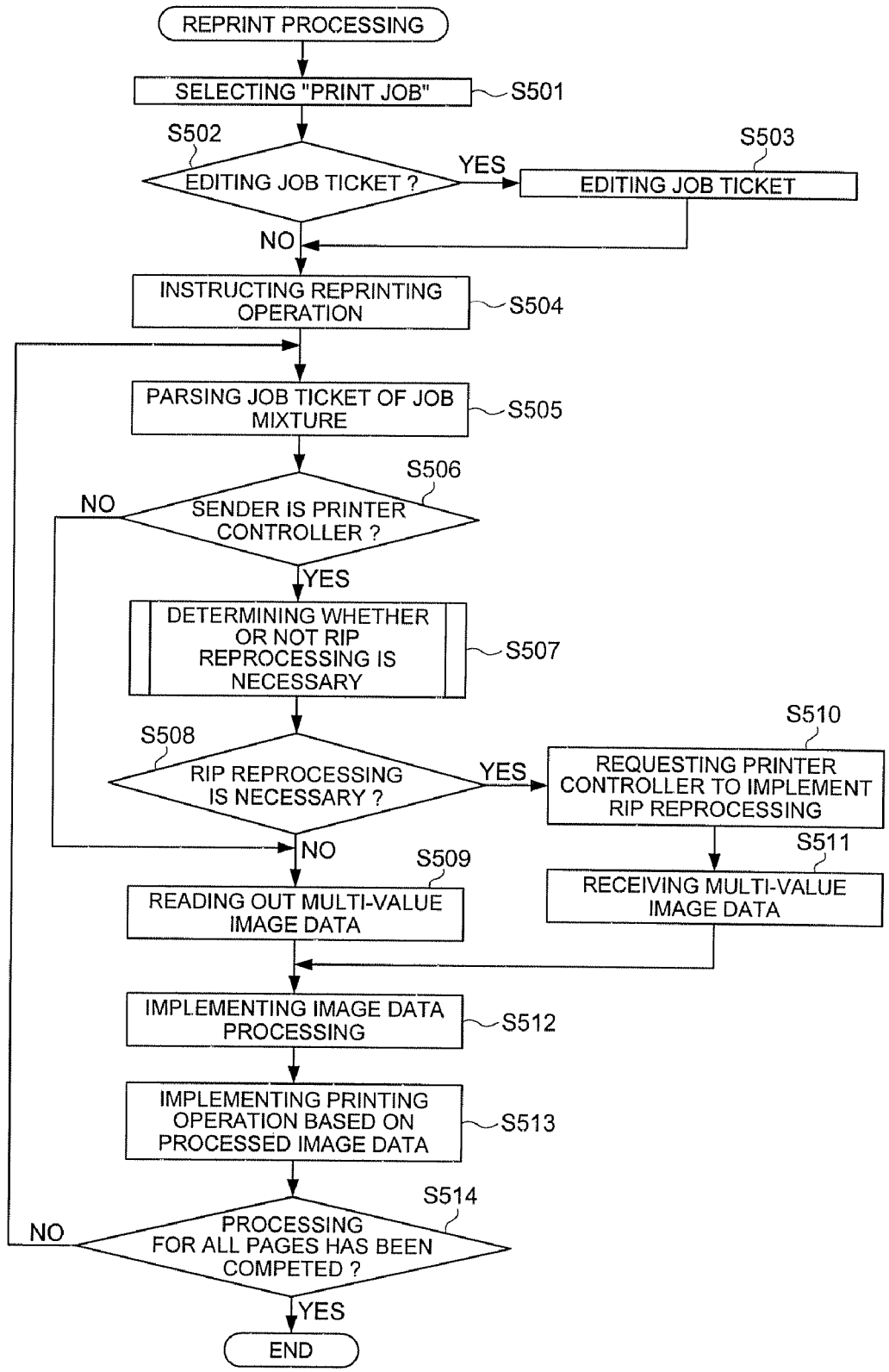
FIG. 11 shows a flowchart indicating a procedure of a reprinting operation to be conducted in an image forming apparatus embodied in the present invention as EMBODIMENT 3.

Next, referring to FIG. 11, an image forming system and an image forming method, embodied in the present invention as EMBODIMENT 3, will be detailed in the following. FIG. 11 shows a flowchart indicating a reprinting procedure.

It is also possible for the image forming apparatus 40 to combine plurality sets of image data, senders of which are different from each other, into a single set of image data so as to implement the reprinting operation based on the combined image data. Accordingly, in EMBODIMENT 3, a controlling method and a reprint processing of a job mixture, defined as a mixture of print jobs received from the senders being different from each other, will be detailed in the following. For instance, in the data structure shown in FIG. 9, the job ticket of the job mixture is stored in the folder having the extension </Mixed>. By configuring the system in such a manner that the job ticket and the location of the image data are described in the job ticket of the job mixture so as to control the correlations between them, a flexible controlling operation becomes possible.

TABLE 3

| ITEMS | STORING ADDRESS |
| --- | --- |
| Job ticket | /Hold/Printer/Job1/PrtJob1.tkt |
| Image data for 1 Page | /Hold/Printer/Job1/PrtJob1.img |
| Image data for 2 Page | /Hold/Scanner/Job1/ScnJob1.img |
| . | . |
| . | . |
| . | . |
| Image data for N Page | /Hold/Printer/Job2/PrntJob2.img |

Further, at the time of the reprinting operation, by parsing the job ticket of the job mixture, and by checking the sender of the image data in a unit of each page, it is possible to determine whether or not the RIP reprocessing is necessary, only with respect to the image data sent from the printer controller.

Referring to the flowchart shown in FIG. 11, the procedure, to be conducted in the case of the job mixture when the reprinting operation is instructed, will be detailed in the following.

Initially, as well as conducted in EMBODIMENT 1 aforementioned, the operator selects the desired print job (Step S501), and determines whether or not the job ticket should be edited (Step S502). When determining that the job ticket should be edited (Step S502; Yes), the operator edits the desired information by using the job ticket editing screen 51 (Step S503), and, returning to the job list screen 50, the operator instructs the reprinting operation (Step S504).

Successively in EMBODIMENT 3, the MFP controlling section 46 parses the job ticket of the job mixture (Step S505) and discriminates the sender of the image data, while referring to the file controlling structure (Step S506). When determining that the sender of the image data is not the printer controller 30 (Step S506; No), the procedure jumps to Step S509. When determining that the sender of the image data is the printer controller 30 (Step S506; Yes), the MFP controlling section 46 parses the changed contents made in the job ticket editing operation (Step S507) to determine whether or not the RIP reprocessing is necessary (Step S508).

Still successively, as well as EMBODIMENT 1 aforementioned, when determining that the RIP reprocessing is not necessary (Step S508; No), the MFP controlling section 46 reads out the image data stored in the image-data and job-ticket storage section 45 (Step S509). Then, the compression/expansion processing section 44 and/or the image processing section 47 applies image data processing to the image data to generate the processed image data (Step S512), so that the image outputting section 48 implements the printing operation based on the processed image data (Step S513).

On the other hand, when determining that the RIP reprocessing is necessary (Step S508; Yes), the MFP controlling section 46 requests the printer controller 30 to implement the RIP reprocessing (Step S510). In response to the above request, the printer controller 30 reads out the concerned print job from the PDL storage section 32, and makes the RIP processing section 33 implement the RIP reprocessing according to the job ticket, so as to generate the multi-value image data, and then, transmits the generated multi-value image data to the image forming apparatus 40. Receiving the multi-value image data sent from the printer controller 30 (Step S511), the image forming apparatus 40 employs the compression/expansion processing section 44 and the image processing section 47 to apply the image data processing, according to the job ticket, to the multi-value image data (Step S512). Then the image outputting section 48 implements the printing operation based on the processed image data (Step S513).

Yet successively, the MFP controlling section 46 determines whether or not the processing for all pages has been competed (Step S514). When determining that the processing for all pages has not been competed (Step S514; No), the procedure returns to Step S505 so as to repeat the abovementioned processing.

As abovementioned, even when implementing the reprinting operation for the job mixture, defined as the mixture of print jobs received from the senders being different from each other, by discriminating the sender of the image data for every page and by determining whether or not the RIP reprocessing is necessary, only with respect to the image data sent from the printer controller, it becomes possible to speedily implement the reprinting operation.

In this connection, although, in the abovementioned flowchart, the sender of the image data is checked for every page so as to determine whether the multi-value image data should be read out or the RIP reprocessing should be requested for every page, it is also applicable that all of the operations for checking the sender for every page are completed at first, and then, the image data of the pages, for which determining that the multi-value image data should be read out, are read out and the RIP reprocessing of the other pages, for which determining that the RIP reprocessing should be requested, are requested, at a time.

[Embodiment 4]

Figure 12:
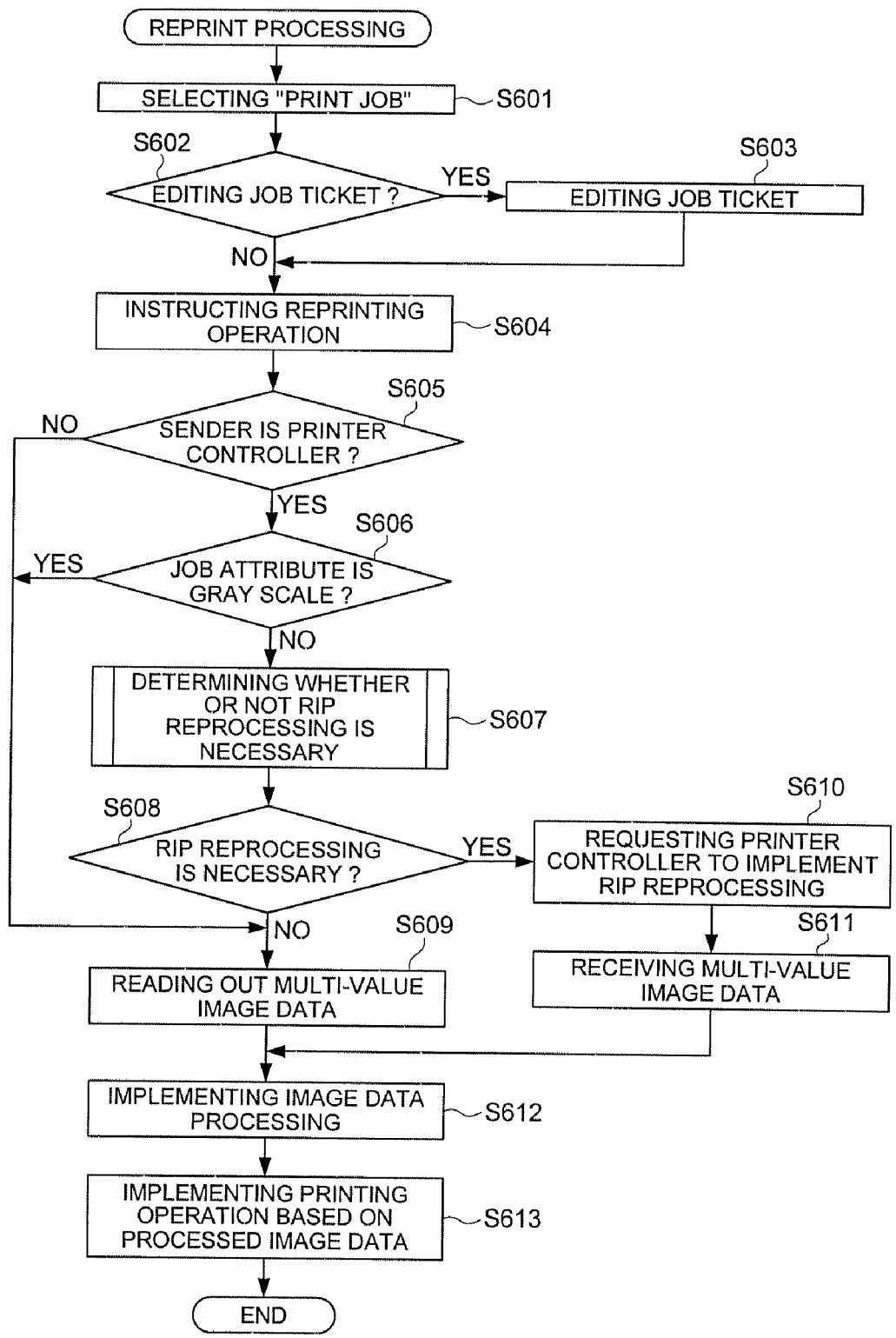
FIG. 12 shows a flowchart indicating a procedure of a reprinting operation to be conducted in an image forming apparatus embodied in the present invention as EMBODIMENT 4.
Figure 13:
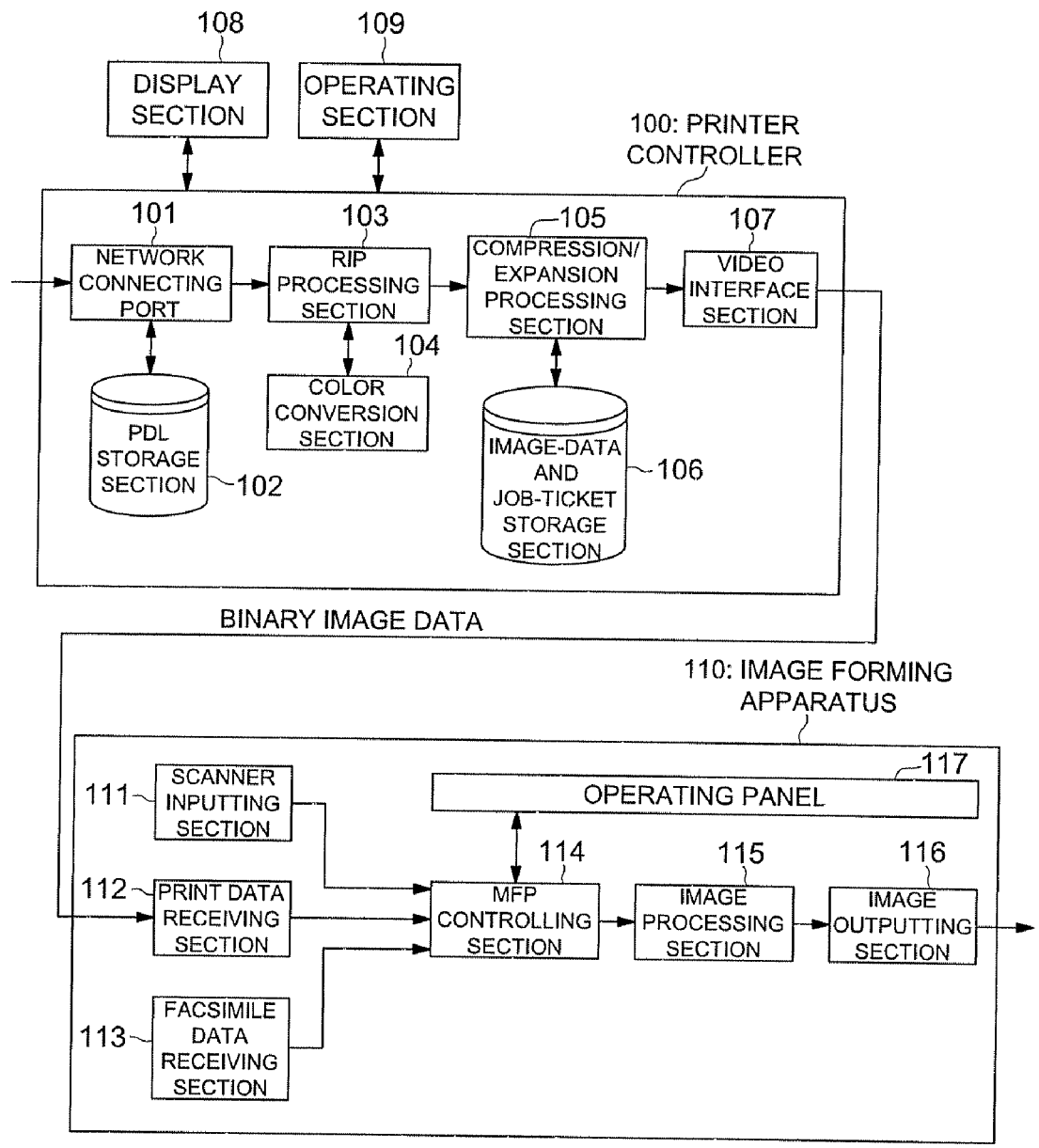
FIG. 13 shows a block diagram indicating configurations of a printer controller and an image forming apparatus and a processing flow of them, configured in a conventional image forming system.

Next, referring to FIG. 12, an image forming system and an image forming method, embodied in the present invention as EMBODIMENT 4, will be detailed in the following. FIG. 12 shows a flowchart indicating a reprinting procedure.

In EMBODIMENT 2 and EMBODIMENT 3 aforementioned, since it is no need to apply the color conversion processing to image data when the image data is represented in the gray scale even if the sender of the image data is the printer controller 30, the RIP reprocessing is not necessary, irrespective of the changed contents in the job ticket.

For instance, when employing the printer driver for printing, the printer driver is selectable of either the CMYK mode or the gray scale mode. When the gray scale mode is selected, the printer controller 30 generates multi-value image data only when the condition of C=M=Y=0 is established. On that occasion, by defining the gray scale as the job attribute in the job ticket, since the image forming apparatus 40 can determine whether or not the image data of the print job received from the printer controller 30 is represented in the CMYK or the gray scale, it becomes possible not to conduct the operation for determining whether or not the RIP reprocessing is necessary, when the gray scale is defined as the job attribute in the job ticket, even if the sender of the image data is the printer controller 30.

Referring to the flowchart shown in FIG. 12, the procedure of the reprinting operation in the above-mentioned case will be detailed in the following.

Initially, as well as conducted in EMBODIMENT 2 aforementioned, the operator selects the desired print job (Step S601), and determines whether or not the job ticket should be edited (Step S602). When determining that the job ticket should be edited (Step S602; Yes), the operator edits the desired information by using the job ticket editing screen 51 (Step S603), and, returning to the job list screen 50, the operator instructs the reprinting operation (Step S604). Further, the MFP controlling section 46 discriminates the sender of the image data, while referring to the file controlling structure (Step S605).

Successively in EMBODIMENT 4, the MFP controlling section 46 determines whether the image data is represented in the CMYK or the gray scale (Step S606), by referring to the job attribute in the job ticket. When determining that the image data is represented in the gray scale (Step S606; Yes), the procedure jumps to Step S609. When determining that the image data is represented in the CMYK (Step S606; No), the MFP controlling section 46 parses the changed contents in the job ticket edited in the Step S603, so as to determine whether or not the RIP reprocessing is necessary (Step S607).

Still successively, as well as EMBODIMENT 2 aforementioned, when determining that the RIP reprocessing is not necessary (Step S608; No), the MFP controlling section 46 reads out the image data stored in the image-data and job-ticket storage section 45 (Step S609). Then, the compression/expansion processing section 44 and/or the image processing section 47 applies image data processing to the image data to generate the processed image data (Step S612), so that the image outputting section 48 implements the printing operation based on the processed image data (Step S613).

On the other hand, when determining that the RIP reprocessing is necessary (Step S608; Yes), the MFP controlling section 46 requests the printer controller 30 to implement the RIP reprocessing (Step S610). In response to the above request, the printer controller 30 reads out the concerned print job from the PDL storage section 32, and makes the RIP processing section 33 implement the RIP reprocessing according to the job ticket, so as to generate the multi-value image data, and then, transmits the generated multi-value image data to the image forming apparatus 40. Receiving the multi-value image data sent from the printer controller 30 (Step S611), the image forming apparatus 40 employs the compression/expansion processing section 44 and the image processing section 47 to apply the image data processing, according to the job ticket, to the multi-value image data (Step S612). Then the image outputting section 48 implements the printing operation based on the processed image data (Step S613).

As described in the above, by determining whether or not the image data is represented in the CMYK or the gray scale at first, and then, by determining whether or not the RIP reprocessing is necessary only when determining that the image data is represented in the CMYK, it becomes possible to speedily implement the reprinting operation.

In this connection, although the compression/expansion processing section 44 applies the screening processing to the multi-value image data so as to generate the binary image data in each of the EMBODIMENTS described in the foregoing, the scope of the present invention is not limited to the above. The present invention can be also applied to such the case that the quasi-gradation image data is created from the multi-value image data, as well. Further, although the image outputting section 48 implements the printing operation in each of the EMBODIMENTS described in the foregoing, it is also applicable that the system is so constituted that only an image, based on the processed image data acquired by applying the image data processing, is displayed, or the processed image data is transmitted to another image forming apparatus so that the other image forming apparatus implements the printing operation.

Any one of the aforementioned embodiments of the present invention is applicable for the image forming system including the printer controller and the image forming apparatus, which are separately configured relative to each other, and for the image forming method to be employed in the abovementioned image forming system.

According to the image forming system and the image forming method, embodied in the present invention, the following effects can be attained.

(1) As the first effect of the present invention, it becomes possible to speedily implement the reprinting operation. This is because, in the image forming system including a printer controller and an image forming apparatus, which are separately configured relative to each other, since the printer controller conducts the RIP processing to generate the multi-value image data, and transmits the generated multi-value image data to the image forming apparatus, so that the image forming apparatus stores the multi-value image data therein and applies various kinds of image data processing, such as the screening processing, the image adjustment processing, etc., to the multi-value image data so as to implement the printing operation, when the reprinting operation for which the RIP reprocessing is not necessary, the image forming apparatus itself can implement the reprinting operation without requesting the printer controller to conduct the RIP reprocessing.

(2) As the second effect of the present invention, it becomes possible to alleviate the burden incurred to the printer controller, and as a result, to effectively implement the various kinds of processing. This is because, since the printer controller conducts only the RIP processing, when the reprinting operation for which the RIP reprocessing is not necessary, the printer controller can concentrate onto RIP processing of other print jobs without conducting the RIP reprocessing concerned.

(3) As the third effect of the present invention, it becomes possible to reduce the amount of data communications to be conducted between the printer controller and the image forming apparatus, and as a result, to effectively utilize a plurality of image forming apparatuses residing in the system. This is because, since, when the reprinting operation for which the RIP reprocessing is not necessary, the reprinting operation can be conducted within the image forming apparatus, it is not necessary for the image forming apparatus to transmit the instruction information to the printer controller, and/or it is not necessary for the printer controller to retransmit the image data to the image forming apparatus.

While the preferred embodiments of the present invention have been described using specific term, such description is for illustrative purpose only, and it is to be understood that changes and variations may be made without departing from the spirit and scope of the appended claims.

What is claimed is:

1. An image forming system, comprising:
a printer controller to parse a print job described in a Page Description Language so as to generate image data; and
an image forming apparatus, configured separately from the printer controller, to implement a printing operation based on the image data;
wherein the printer controller is provided with:
a first processing section to apply a first processing to the print job so as to generate multi-value image data; and
a transmitting section to transmit the multi-value image data to the image forming apparatus; and
wherein the image forming apparatus is provided with:
a receiving section to receive the multi-value image data transmitted by the transmitting section;
a second processing section to apply a second processing to the multi-value image data so as to generate processed image data, serving as printable image data based on which a reproduced image can be directly printed;

an image outputting section to implement the printing operation based on the processed image data wherein the printer controller is further provided with:
- a first storage section to store the print job; while the image forming apparatus is further provided with:
- a second storage section to store the multi-value image data; and
- a control section to determine whether or not a reapplication of the first processing is necessary for a reprinting operation, based on a changed content of a job ticket correlated to the multi-value image data, when the reprinting operation is instructed; and wherein, when determining that the reapplication of the first processing is not necessary, the control section reads out the multi-value image data from the second storage section, makes the second processing section apply the second processing to the multi-value image data, and then, makes the image outputting section implement the printing operation based on the processed image data generated by the second processing section; and wherein, when determining that the reapplication of the first processing is necessary, the control section sends a request for retransmitting multi-value image data, regenerated corresponding to the changed content of the job ticket, to the printer controller.

2. The image forming system of claim 1,
wherein, receiving the request for retransmitting the multi-value image data, the printer controller reads out the print job from the first storage section, to regenerate the multi-value image data corresponding to the changed content of the job ticket, and retransmits the multi-value image data regenerated to the image forming apparatus; and wherein, receiving the multi-value image data regenerated, the image forming apparatus makes the second processing section apply the second processing, corresponding to the changed content of the job ticket, to the multi-value image data received, and makes the image outputting section implement the printing operation based on the processed image data revised.

3. The image forming system of claim 1,
wherein, when the changed content of the job ticket indicates necessity of a color conversion processing, the control section determines that the reapplication of the first processing is necessary.

4. The image forming system of claim 3,
wherein the changed content of the job ticket, indicating necessity of the color conversion processing, is any one of a kind change of paper sheet, a designation change of paper sheet feeding tray associated with the kind change of paper sheet, a designation change of screen, a designation change of profile and a designation change of rendering intent.

5. The image forming system of claim 1,
wherein the control section determines whether the multi-value image data is represented in a CMYK or a gray scale; and wherein, when determining that the multi-value image data is represented in the gray scale, the control section suspends the operation for determining whether or not the reapplication of the first processing is necessary for the reprinting operation.

6. The image forming system of claim 1,
wherein the image forming apparatus is further provided with a document reading section and/or a facsimile data receiving section, and the multi-value image data is stored in the second storage section in such a manner that a sender of the multi-value image data can be discriminated; and wherein, when the reprinting operation is instructed, the control section discriminates the sender of the multi-value image data, so that the control section suspends the operation for determining whether or not the reapplication of the first processing is necessary for the reprinting operation when determining that the sender is either the document reading section or the facsimile data receiving section.

7. An image forming method to be employed in an image forming system that comprises: a printer controller to parse a print job described in a Page Description Language so as to generate image data; and an image forming apparatus, configured separately from the printer controller, to implement a printing operation based on the image data, the image forming method, comprising:
- applying a first processing to the print job so as to generate multi-value image data in the printer controller;
- transmitting the multi-value image data to the image forming apparatus;
- applying a second processing to the multi-value image data, received from the printer controller, so as to generate processed image data, serving as printable image data based on which a reproduced image can be directly printed, and implementing the printing operation based on the processed image data, in the image forming apparatus;
- storing the print job in the printer controller;
- storing the multi-value image data in the image forming apparatus; and
- determining whether or not a reapplication of the first processing is necessary for a reprinting operation, based on a changed content of a job ticket correlated to the multi-value image data, when the reprinting operation is instructed, in the image forming apparatus; and wherein, when determining that the reapplication of the first processing is not necessary, the image forming apparatus reads out the multi-value image data stored in advance, applies the second processing to the multi-value image data, and then, implements the printing operation based on the processed image data; and wherein, when determining that the reapplication of the first processing is necessary, the image forming apparatus sends a request for retransmitting multi-value image data, regenerated corresponding to the changed content of the job ticket, to the printer controller.

8. The image forming method of claim 7,
wherein, receiving the request for retransmitting the multi-value image data, the printer controller reads out the print job stored in advance, to regenerate the multi-value image data corresponding to the changed content of the job ticket, and retransmits the multi-value image data regenerated to the image forming apparatus; and wherein, receiving the multi-value image data regenerated, the image forming apparatus applies the second processing, corresponding to the changed content of the job ticket, to the multi-value image data received, and implements the printing operation based on the processed image data revised.

9. The image forming method of claim 7,
wherein, when the changed content of the job ticket indicates necessity of a color conversion processing, the image forming apparatus determines that the reapplication of the first processing is necessary.

10. The image forming method of claim 9,
wherein the changed content of the job ticket, indicating necessity of the color conversion processing, is any one of a kind change of paper sheet, a designation change of paper sheet feeding tray associated with the kind change of paper sheet, a designation change of screen, a designation change of profile and a designation change of rendering intent.

11. The image forming method of claim 7,
wherein the image forming apparatus determines whether the multi-value image data is represented in a CMYK or a gray scale; and
wherein, when determining that the multi-value image data is represented in the gray scale, the image forming apparatus suspends the operation for determining whether or not the reapplication of the first processing is necessary for the reprinting operation.

12. The image forming method of claim 7,
wherein the image forming apparatus is provided with a document reading section and/or a facsimile data receiving section, and the multi-value image data is stored in such a manner that a sender of the multi-value image data can be discriminated; and
wherein, when the reprinting operation is instructed, the image forming apparatus discriminates the sender of the multi-value image data, so that the image forming apparatus suspends the operation for determining whether or not the reapplication of the first processing is necessary for the reprinting operation when determining that the sender is either the document reading section or the facsimile data receiving section.

* * * * *